United States Patent [19]

Yoshigai

[11] Patent Number: 4,762,018
[45] Date of Patent: Aug. 9, 1988

[54] BRAKE LEVER DEVICE

[76] Inventor: Toshinobu Yoshigai, 8-21, Nakakosaka 5-chome, Higashi-Osaka-shi, Osaka-fu, Japan

[21] Appl. No.: 903,686

[22] Filed: Sep. 4, 1986

Related U.S. Application Data

[63] Continuation of Ser. No. 592,582, Mar. 23, 1984, abandoned.

[30] Foreign Application Priority Data

Apr. 25, 1983 [JP] Japan .............................. 58-62736[U]
May 19, 1983 [JP] Japan .............................. 58-76554[U]

[51] Int. Cl.$^4$ ............................................ G05G 1/04
[52] U.S. Cl. .................................. 74/523; 74/501 A; 74/551.9
[58] Field of Search ................. 74/523, 524, 488, 489, 74/525, 551.9, 475, 501 A, 526, 527, 528

[56] References Cited

U.S. PATENT DOCUMENTS

| | | | |
|---|---|---|---|
| 3,645,151 | 2/1972 | Yoshikawa | 74/551.9 |
| 3,733,922 | 5/1973 | Tripp | 74/523 |
| 3,803,941 | 4/1974 | Yoshikawa | 74/523 |
| 3,974,712 | 8/1976 | Kaufman et al. | 74/99 A |
| 4,263,818 | 4/1981 | Ozaki | 74/475 |
| 4,318,307 | 3/1982 | Kine | 74/523 |
| 4,459,871 | 7/1984 | Shimano | 74/551.9 |

FOREIGN PATENT DOCUMENTS

| | | | |
|---|---|---|---|
| 0018929 | 11/1980 | European Pat. Off. | 74/523 |
| 0067692 | 12/1982 | European Pat. Off. | 74/523 |
| 1028059 | 5/1953 | France | 74/551.9 |
| 2481221 | 10/1981 | France | 74/523 |
| 241997 | 11/1925 | United Kingdom | 74/475 |

Primary Examiner—Gary L. Smith
Assistant Examiner—Vinh Luong
Attorney, Agent, or Firm—Koda and Androlia

[57] ABSTRACT

A brake lever device comprising a housing main body formed from an extruded frame of light alloy by cutting the frame to a short width and including a handle holding portion and fastening flange portions at one side thereof and a fitting grooved portion at the other side thereof, these portions extending in the same direction, a support member including a fitting portion fitting in the grooved portion of the housing main body, and a brake lever pivoted to the housing main body and having a connecting hole formed in a corner portion of the main body of the lever and a connecting hole formed in a support plate attached to one side of the corner portion for supporting a fixing member at one end of an inner wire with the fixing member fitted in the connecting holes.

4 Claims, 5 Drawing Sheets

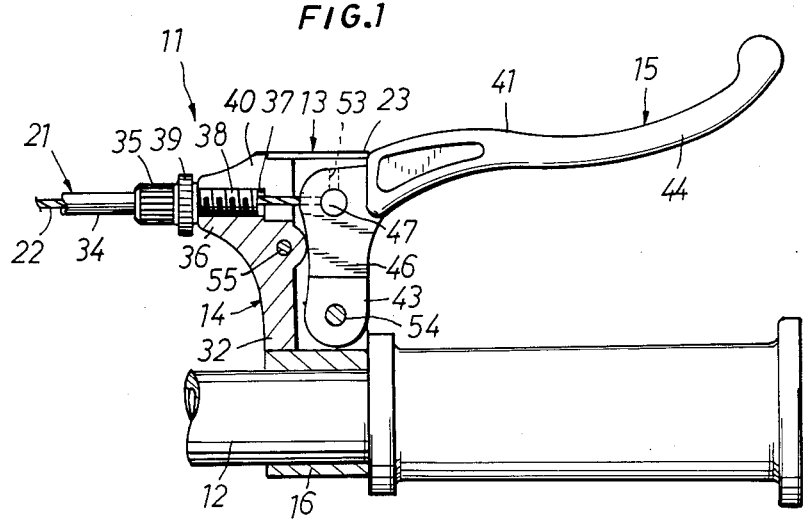

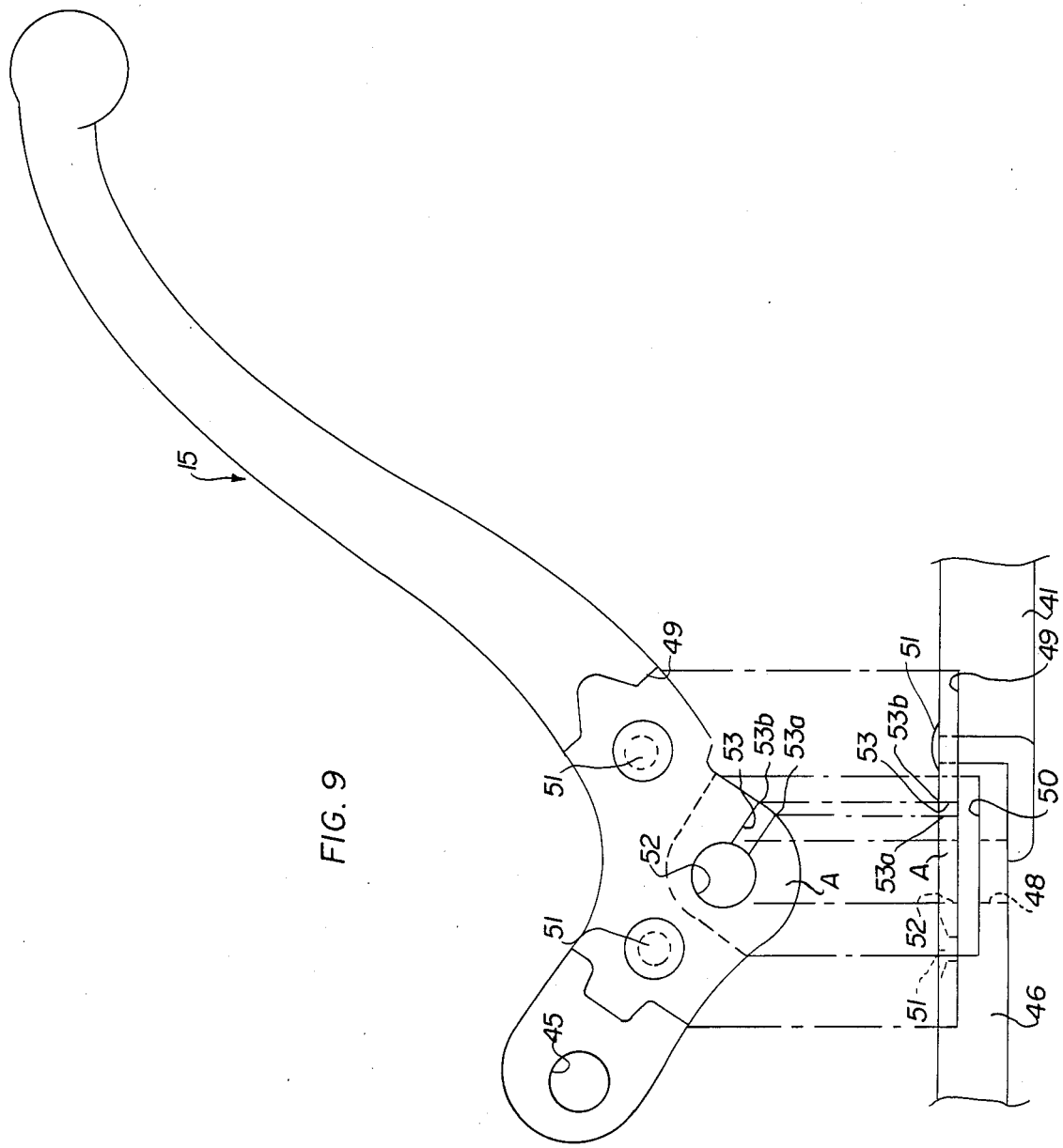

BRAKE LEVER DEVICE

This is a continuation of application Ser. No. 592,582, filed Mar. 23, 1984 now abandoned.

BACKGROUND OF THE INVENTION

Generally brake lever devices comprise a housing fixed to a handle and a brake lever pivoted to the housing and coupled to a rim brake or the like by a Bowden cable, such that the brake is operated by pivotally moving the lever.

The brake lever of this type is generally L-shaped and includes a portion pivoted to the housing and an operating portion for pivotally moving the lever. The corner portion between the pivoted portion and the operation portion has a connecting hole by which a fixing member at the end of the inner wire of the Bowden cable is supported rotatably relative to the lever. The lever is further formed, in communication with the connecting hole, with an insertion groove for inserting the inner wire therethrough when fitting the fixing member into the hole and a cut groove for avoiding the contact of the inner wire when the lever is operated. The brake lever further has a pivot hole for rotatably attaching the lever to the housing.

The brake lever of the above construction is usually made from a light alloy rod of circular cross section by forging. Since the connecting hole, the insertion groove and the cut groove are to be formed in the corner portion, the corner portion must have a larger width than the pivoted portion or the operating portion. Accordingly the diameter of the rod to be forged is so determined that the corner portion will have a sufficient width. Consequently forging of the operating portion of reduced width results in an excess of material which must be cut away and wasted, necessitating labor for finishing. Furthermore, the portion of the lever to which the fixing member of the inner wire is to be attached requires a cumbersome machining procedure for forming the connecting hole, the insertion groove and the cut groove to entail a low manufacturing efficiency and an increased cost.

On the other hand, the housing is integrally formed with a portion for supporting a holder for holding the end of the outer wire of the Bowden cable, so that the housing is complicated in shape in its entirety and is unfit for mass production.

SUMMARY OF THE INVENTION

An object of the present invention is to provide a brake lever which can be manufactured easily and efficiently with use of a greatly reduced amount of forged material.

Another object of the invention is to provide a housing which is composed of divided components and which is thereby made easy to make and more suited to mass production.

Another object of the invention is to provide a brake lever device which can be manufactured at a reduced cost.

Still another object of the invention is to provide a brake lever in which the corner portion has improved strength.

Other objects of the present invention will become apparent from the following description and the accompanying drawings.

BRIEF DESCRIPTION OF THE DRAWINGS

FIG. 1 is a plan view partly in section and showing an embodiment of the invention;

FIG. 2 is an exploded view of the same;

FIG. 3 is a view showing a housing as it is seen in the direction of the line III—III in FIG. 2;

FIG. 4 is a view showing a support member as it is seen in the direction of the line IV—IV in FIG. 2;

FIG. 9 is a plan view which corresponds to FIG. 6;

DESCRIPTION OF THE PREFERRED EMBODIMENT

Figure 5:
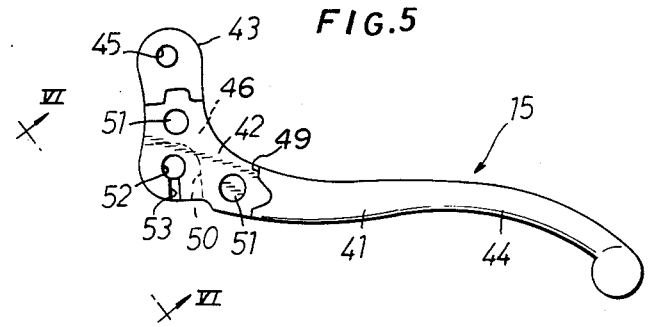
FIG. 5 is a plan view of the brake lever of FIG. 1 flipped over.

With reference to FIGS. 1 and 2, a brake lever device 11 comprises a housing including a housing main body 13 fixed to a handle 12 and a support member 14 attached to the housing main body 13, and a brake lever 15 pivoted to the housing main body 13.

The housing main body 13 is formed by extruding a light alloy material into a frame and cutting the frame to a predetermined short width. As seen in FIGS. 1 to 3, the main body 13 has at its one side, i.e., at its lower side, a generally annular handle holding portion 16 having the handle 12 inserted therethrough. A cut groove 17 is formed in the holding portion 16 at one side thereof, and fastening flanges 18, 19 extend outward from the opposed edges of the holding portion 16 defining the cut groove 17. At the other side, i.e., at the upper side, the housing main body 13 has a generally U-shaped grooved portion 20 having an open upper end which serves as an insertion groove 23 for the inner wire 22 of a Bowden cable 21 to be inserted therethrough. Each of the handle holding portion 16, the cut groove 17, the flanges 18, 19, the fitting grooved portion 20 and the insertion groove 23 has the same width in a direction. The flanges 18, 19 have holes 25, 26 for a fastening bolt 24. The housing main body 13 is fixedly fastened to the handle 12, with the holding portion 16 in the desired position, by tightening up a nut 27 on the bolt 24. The fitting grooved portion 20 is formed with insertion holes 28, 29 for attaching the brake lever 15 thereto and with insertion holes 30, 31 for attaching the support member 14.

The support member 14 is made of rigid synthetic resin. As seen in FIGS. 1, 2 and 4, the support member 14 has at one side thereof a fitting portion 32 removably fitted in the grooved portion 20 and formed with an insertion hole 33 which communicates with the insertion holes 30, 31 when the fitting portion 32 is fitted in the grooved portion 20. The support member 14 is removably or fixedly attached to the housing main body 13 by a lock pin 55 inserted through the holes 30, 31 and 33. The support member 14 has at the other side thereof a mount 36 for a holder 35 for holding the outer wire 34 of the Bowden cable 21. The mount 36 is internally threaded as at 37. The outer wire holder 35 has an externally threaded portion 38 which is screwed into the internally threaded portion 37 and is movable axially thereof. A lock nut 39 is screwed on the externally threaded portion 38 and is movable axially thereof. As shown in FIGS. 1 and 4, the support member 14 has an insertion groove 40 formed in its upper end and communicating with the internally threaded portion 37 for removably inserting the inner wire 22 therethrough. Further the outer wire holder 35 and the lock nut 39 are each formed with an insertion groove for inserting the inner wire therethrough.

With reference to FIGS. 1, 2, 5 and 6, the brake lever 15 comprises a lever main body 41 made of light alloy and generally L-shaped by forging and a support plate 42 attached to the main body 41. The lever main body 41 includes a portion 43 pivoted to the housing main body 13 and an operating portion 44 to be turned. The pivoted portion 43 has a bolt hole 45 in communication with the insertion holes 28, 29 of the housing main body 13. Between the pivoted portion 43 and the operating portion 44, the lever main body 41 has a corner portion 46 which is formed with a connecting hole 48 for supporting one end of a fixing member 47 provided at the end of the inner wire 22 of the Bowden cable 21. The support corner wall 46 is of reduced thickness and has a recessed portion 49 on one side thereof for the support plate 42 to fit in and a stopped portion 50 positioned toward the outer portion of the corner for loosely guiding the inner wire 22. A pair of support plate retaining members 51, 51 in the form of a solid cylinder is formed on the recessed portion 49.

The support plate 42 is blanked out from an iron plate or like metal plate as by press work and shaped in conformity with the shape of the recessed portion 49 so as to be fittable therein. The support plate 42 has a connecting hole 52 corresponding to the connecting hole 48 and holes for inserting the retaining members 51 therein. The support plate 42 has an insertion groove 53 communicating with the hole 52 for inserting the inner wire 22 therethrough. With the support plate 42 fitted in the recessed portion 49, the projecting ends of the retaining members 51 are crimped, whereby the plate 42 is fixed to the lever main body 41.

As shown in FIG. 1, the pivoted portion 43 of the lever main body 41 is inserted in the fitting grooved portion 20 of the housing main body 13, and a bolt 54 is inserted through the hole 45, whereby the lever main body 41 is supported by the housing main body 13 pivotally movably. The fixing member 47 at the end of the inner wire 24 inserted through the outer wire holder 35 and the support member has its opposite ends fitted in the connecting holes 48 and 52 of the corner portion 46 and the support plate 42 (the corner wall 46 is apparent in FIG. 1 and support plate 42 is apparent in FIG. 5) and thereby supported. The inner wire 22 is positioned in the stepped portion 50 of the corner portion 46, and the portion 46 and the support plate 42 at opposite sides of tne stepped portion 50 define a cut groove for guiding the inner wire 22 loosely inserted therein. Thus the fixing member 47 fitted in the connecting holes 48, 52 is relatively rotatably connected to and supported by the corner portion of the lever.

Figure 8:
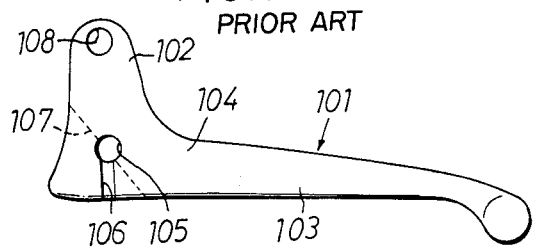
FIG. 8 is a plan view of a conventional brake lever in the same orientation as the brake lever of FIG. 5.
Figure 6:
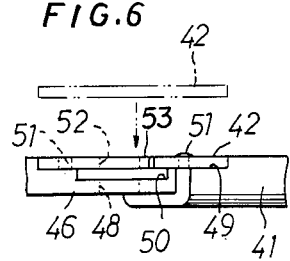
FIG. 6 is a view showing the brake lever as it is seen along the line VI—VI in FIG. 5.

FIG. 8 shows a conventional brake lever 101 which is generally L-shaped and which comprises a portion 102 pivoted to a housing and an operating portion 103 movable pivotally. The corner portion 104 between the pivoted portion 102 and the operating portion 103 has a connecting hole 105 by which a fixing member at the inner wire end of a Bowden cable is connected to and supported by the lever 101 so as to be rotatable relative thereto. The connecting hole 105 is in communication with an insertion groove 106 for inserting the inner wire therethrough when fitting the fixing member into the hole 105 and with a cut groove 107 for avoiding the contact of the inner wire when the lever 101 is operated. The brake lever 101 further has a pivot hole 108 for rotatably attaching the lever to the housing.

When the conventional brake lever 101 having such a construction is to be made, the connecting hole 105, the insertion groove 106 and the cut groove 107 must be formed in the corner portion 104, so that the corner portion 104 needs to have a larger width than the pivoted portion 102 and the operating portion 103. Accordingly the diameter of the material to be forged is so determined that the corner portion 104 will have a sufficient width. This involves the following drawbacks. Forging of the operating portion 103 which has a reduced width results in an excess of material which must be cut away and wasted, necessitating labor for finishing. The lever requires an increased number of complicated machining steps for forming the connecting hole 105, the insertion groove 106 and the cut groove 107 and is therefore inefficient and costly to make.

Figure 7:
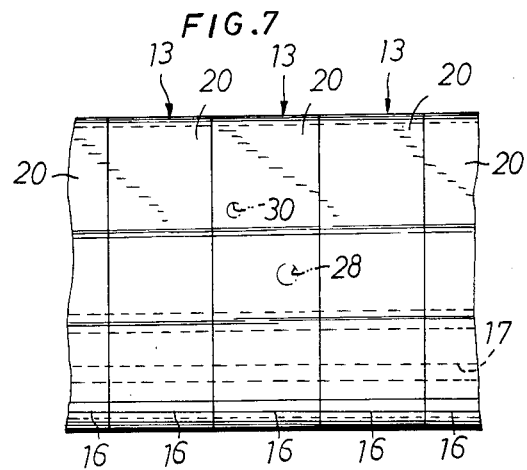
FIG. 7 is a view showing an extruded frame for housings.
Figure 10:
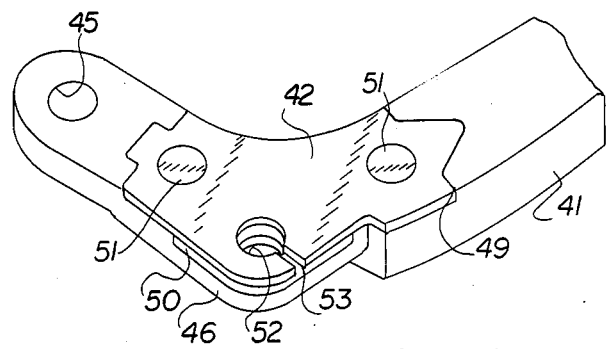
FIG. 10 is an exploded view of one side of the lever.
Figure 11:
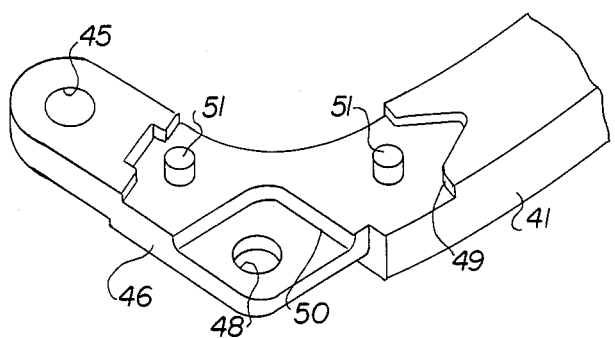
FIG. 11 is an exploded view of the other side of the lever.
Figure 12:
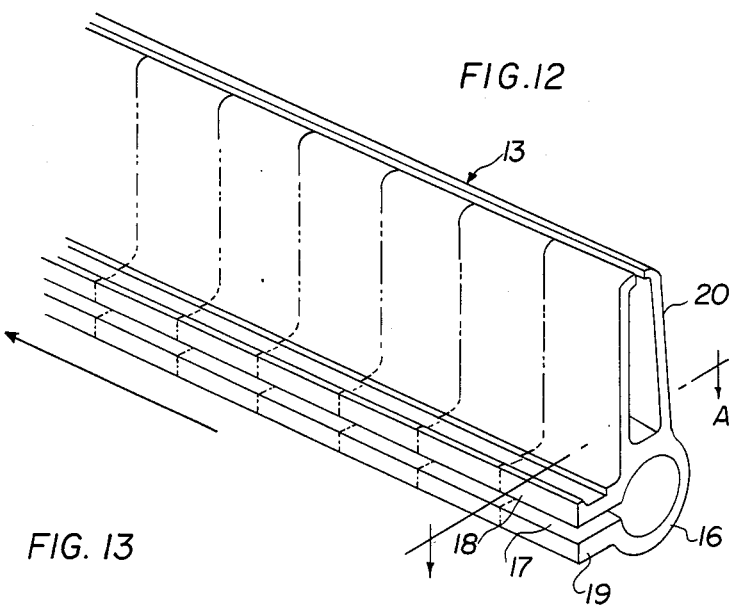
FIG. 12 is a perspective view of the extruded frame in FIG. 7.
Figure 13:
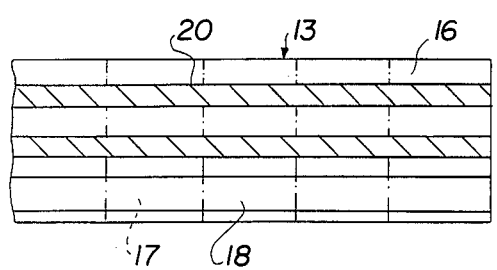
FIG. 13 is a sectional plan view along the line A—A in FIG. 12.

However, according to the invention described above, one end of the fixing member 47 only is suppored by the corner portion 46 of the lever main body 41, so that the corner portion can be of a smaller thickness than the conventional structure shown in FIG. 8 wherein the opposite ends of the fixing member are supported by the corner portion. Consequently, a sufficient width can be obtained by spreading a material of relatively small diameter by forging. Thus, the lever main body 41 can be forged from a material of relatively small diameter from which the pivoted portion 43 and the operation portion 44 can be formed. This assures the advantage of reducing the waste of material and eliminating the need to cut away the excess of material for finishing. Furthemore, the support plate 42 is easy to make since the connecting hole 52, the insertion groove 53 and the holes for inserting the support plate retaining members 51 can be formed simultaneously when the plate 42 is blanked out. The support plate 42 needs only to be fitted in the recessed portion 49 of the corner portion 46 of the lever main body 41 and does not require the cumbersome procedure conventionally needed for machining the insertion groove 106 and cut groove 107. Accordingly the brake lever 15 is easy, efficient and inexpensive to make. Further because the support plate 42 by which the fixing member 47 is connected to and supported on the corner portion of the lever is a metal plate, the plate serves as a reinforcing plate for imparting improved strength to the connecting or supporting corner portion. The support member 14 for supporting the outer wire holder 35 is separate from the housing main body 13. This enables the housing main body 13 to have a simplified shape and simplified structure in that the handle holding portion 16, fitting grooved portion 20, flanges 18, 19, etc. each have the same width in a direction. Because the housing main body 13 is rectangular in side elevation and includes the holding portion 16, grooved portion 20, flanges 18, 19, etc. which extend in the same direction each with the same width, the housing main body 13 can be made easily from an extruded frame shown in FIG. 7 and including these portions each extending in the same direction, by cutting the frame to a predetermined short width. This permits easy selection of material, renders the housing suited to mass production and makes the housing less costly. The support member 14, which is a separate member, can be manufactured also with ease. When made to have an increased wall thickness, the support member 14 can be adapted to support the outer wire holder 35 with enhanced strength. The housing main body 13 and the support member 14, which are separate members, can be replaced individually when damaged.

Although the support plate 42 of the foregoing embodiment is made of iron or like metal plate, the plate can be made of the same light alloy as the lever main body 41. Further althrough the support plate 42 is fastened in place by crimping, rivets, screws or the like are alternatively usable. The cut groove 17 and flanges 18, 19, which are formed at one side of the handle holding portion 16, are not limited to the embodiment in position but can be provided at the lower side of the holding portion 16.

What is claimed is:

1. A brake lever device including:
   a housing main body having a handle portion to be fixed to a handle and fastening flanges projecting outwardly from opposed edges of the holding portion defining a cut groove and also having a fitting groove portion;
   a support member having an outer wire holding mount; and
   a brake lever;
   wherein the brake lever is inserted into the fitting groove portion at one side and pivoted on the housing main body and the support member is inserted into the fitting groove portion at the other side and an inner wire is inserted through said support member and an end of the inner wire is fitted on a corner portion of the brake lever wherein said corner portion is provided with a connecting hole and separate, support plate is attached to the brake lever and is provided with another hole adjacent said connecting hole, whereinto a fixing member provided at the end of the inner wire is fitted, thereby the inner wire is connected with the brake lever;
   wherein the housing main body is one-piece formed with the handle holding portion, the fastening flanges and the fitting groove portion by cutting a light alloy frame into short dimension pieces, each piece having said handle holding portion, said fastening flanges and said fitting groove provided at one side thereof; and
   wherein a fitting portion is formed at one side of the support member and is removably fitted in the fitting groove portion of the housing main body, and a mount for an outer wire holder is formed at an other side of the support member, the fitting portion having an insertion hole in communication with insertion holes formed in the fitting groove portion and the fitting portion is fitted in the fitting groove portion, the support member being fixed to the housing main body by a lock pin inserted through the insertion hole.

2. A brake lever device as defined in claim 1 wherein a fitting portion is formed at one side of the support member and is removably fittable in the fitting groove portion of the housing main body and a mount for an outer wire holder is formed at an other side of the support member and has an internally threaded portion, the outer wire holder having an externally threaded portion movable into or out of the internally threaded portion in screw-thread engagement therewith, the outer wire holder being formed in its upper end with an insertion groove communicating with the internally threaded portion for removably inserting the inner wire therethrough.

3. A brake lever device as defined in claim 1 wherein the handle holding portion, the fastening flanges and the fitting grooved portion of the housing main body each have a same width in the same direction and are cut to a short length.

4. A brake lever device as defined in claim 1 wherein the support plate comprises a reinforcing metal plate.

* * * * *